US008552838B2

(12) United States Patent
Addy

(10) Patent No.: US 8,552,838 B2
(45) Date of Patent: Oct. 8, 2013

(54) PASSIVE WIRELESS SYSTEM

(75) Inventor: Kenneth L. Addy, Massapequa, NY (US)

(73) Assignee: Honeywell International Inc., Morristown, NJ (US)

( * ) Notice: Subject to any disclaimer, the term of this patent is extended or adjusted under 35 U.S.C. 154(b) by 738 days.

(21) Appl. No.: 12/276,962

(22) Filed: Nov. 24, 2008

(65) Prior Publication Data

US 2010/0127837 A1 May 27, 2010

(51) Int. Cl.

| | |
|---|---|
| ***H04Q 5/22*** | (2006.01) |
| ***G08B 13/08*** | (2006.01) |
| ***G08B 13/00*** | (2006.01) |
| ***G08B 13/14*** | (2006.01) |
| ***G08B 29/00*** | (2006.01) |
| ***G08B 23/00*** | (2006.01) |
| ***H04W 4/00*** | (2009.01) |
| ***G08C 19/12*** | (2006.01) |
| ***G01M 17/00*** | (2006.01) |
| ***G05B 11/01*** | (2006.01) |

(52) U.S. Cl.

USPC ..................... 340/10.34; 340/545.1; 340/541; 340/572.1; 340/5.64; 340/573.4; 370/328; 341/174; 701/31.6; 700/13

(58) Field of Classification Search

USPC .................. 340/572.1, 572.3, 665, 686, 10.1, 340/10.41, 541, 573.1, 568.1, 531, 539.1, 340/539.26, 825.49, 572.4, 539.14, 540, 340/545.1, 825.69, 825.72; 700/65, 19, 66, 700/169, 83; 709/237, 227–228, 208

See application file for complete search history.

(56) References Cited

U.S. PATENT DOCUMENTS

| | | | | |
|---|---|---|---|---|
| 5,874,896 | A * | 2/1999 | Lowe et al. | 340/572.1 |
| 6,453,687 | B2 * | 9/2002 | Sharood et al. | 62/127 |
| 6,707,376 | B1 | 3/2004 | Patterson et al. | |
| 6,792,319 | B1 * | 9/2004 | Bilger | 700/13 |
| 7,106,233 | B2 * | 9/2006 | Schroeder et al. | 341/141 |
| 7,154,392 | B2 * | 12/2006 | Rastegar et al. | 340/552 |
| 7,374,105 | B2 | 5/2008 | Zhu et al. | |
| 7,630,802 | B2 * | 12/2009 | Breed | 701/31.6 |
| 7,961,094 | B2 * | 6/2011 | Breed | 340/541 |
| 2004/0075562 | A1 * | 4/2004 | Land | 340/573.4 |
| 2004/0150521 | A1 * | 8/2004 | Stilp | 340/545.1 |

(Continued)

FOREIGN PATENT DOCUMENTS

| | | | |
|---|---|---|---|
| WO | WO 2004/081849 | A1 | 9/2004 |
| WO | WO 2006/066175 | A1 | 6/2006 |

OTHER PUBLICATIONS

European Search Report corresponding to Application No. EP 09 17 6375, dated Oct. 8, 2010.

(Continued)

*Primary Examiner* — Jennifer Mehmood
*Assistant Examiner* — Mirza Alam
(74) *Attorney, Agent, or Firm* — Husch Blackwell

(57) ABSTRACT

A passive wireless system for monitoring a protected area. The passive wireless system comprises at least one passive sensor for sensing an event, a reader for receiving signals from the at least one passive sensor, a plurality of exciters disposed within the protected area for transmitting a radio frequency pulse at a variable time interval to the at least one passive sensor, and a controller for controlling each of the plurality of exciters to transmit the radio frequency pulse at the variable time interval. The radio frequency pulse powers the passive sensors.

12 Claims, 4 Drawing Sheets

(56) References Cited

U.S. PATENT DOCUMENTS

| | | | | |
|---|---|---|---|---|
| 2004/0160309 | A1 | 8/2004 | Stilp | |
| 2004/0160324 | A1* | 8/2004 | Stilp | 340/572.1 |
| 2004/0208142 | A1* | 10/2004 | Saw | 370/328 |
| 2004/0212493 | A1* | 10/2004 | Stilp | 340/531 |
| 2004/0212500 | A1* | 10/2004 | Stilp | 340/541 |
| 2004/0252015 | A1* | 12/2004 | Galperin et al. | 340/5.64 |
| 2008/0111688 | A1 | 5/2008 | Nikitin et al. | |

OTHER PUBLICATIONS

Finkenzeller, Klaus, "RFID Handbook Second Edition," Dec. 31, 2003, John Wiley & Sons Ltd., Great Britain, XP002604143 ISBN: 0470844027 p. 176, paragraph 5.2.4; p. 205, paragraph 7.2.3—p. 219, paragraph 7.2.4.3; p. 274, paragraph 10.1.1.

* cited by examiner

PASSIVE WIRELESS SYSTEM

FIELD OF THE INVENTION

The invention relates to wireless systems, environment monitoring systems, wireless communication and passive devices. More particularly, the invention relates to a system and method for extending a communication range of a passive sensor in a monitoring system.

BACKGROUND

Monitoring systems are used to monitor local environment and protect both commercial and residential property. A monitoring system can be, but is not limited to, a security system or a temperature control system. A typical system includes a plurality of sensors that detects various events within a protected area. The events can range from motion, heat, carbon monoxide, noise and glass break. A sensor can be either a wired sensor or a wireless sensor.

Wireless sensors are popular because they allow for rapid, low cost and easy installation. A wireless sensor can be either a passive or active sensor. An active sensor requires a battery power source that needs to be periodically replaced. A passive sensor operates by backscattering signals received from a reader or interrogator. A passive sensor does not require a battery. However, the passive sensor has limited communication range.

SUMMARY OF THE INVENTION

Accordingly, disclosed a passive wireless monitoring system. The monitoring system includes sensors for monitoring a protected area for events. At least some of the sensors are passive sensors. The passive sensors are powered by signals that are received from a plurality of remote exciters and a reader. The remote exciters are deployed in a protected area. The remote exciters are incorporated into existing monitoring system components such as a security system keypad, interface or wired sensor.

In an embodiment, at least one of the remote exciters is integrated into a HVAC controller and a temperature control user interface.

A reader is placed in the protected area for receiving signals from the passive sensors.

Each of the exciters transmits a radio frequency pulse at variable time intervals to the sensors. The variable time interval is controller by a controller. The controller transmits a signal to the exciters that causes the exciters to transmit the radio frequency pulse.

BRIEF DESCRIPTION OF THE DRAWINGS

These and other features, benefits and advantages of the present invention will become apparent by reference to the following figures, with like reference numbers referring to like structures across the views, wherein.

DETAILED DESCRIPTION OF THE INVENTION

Figure 1:
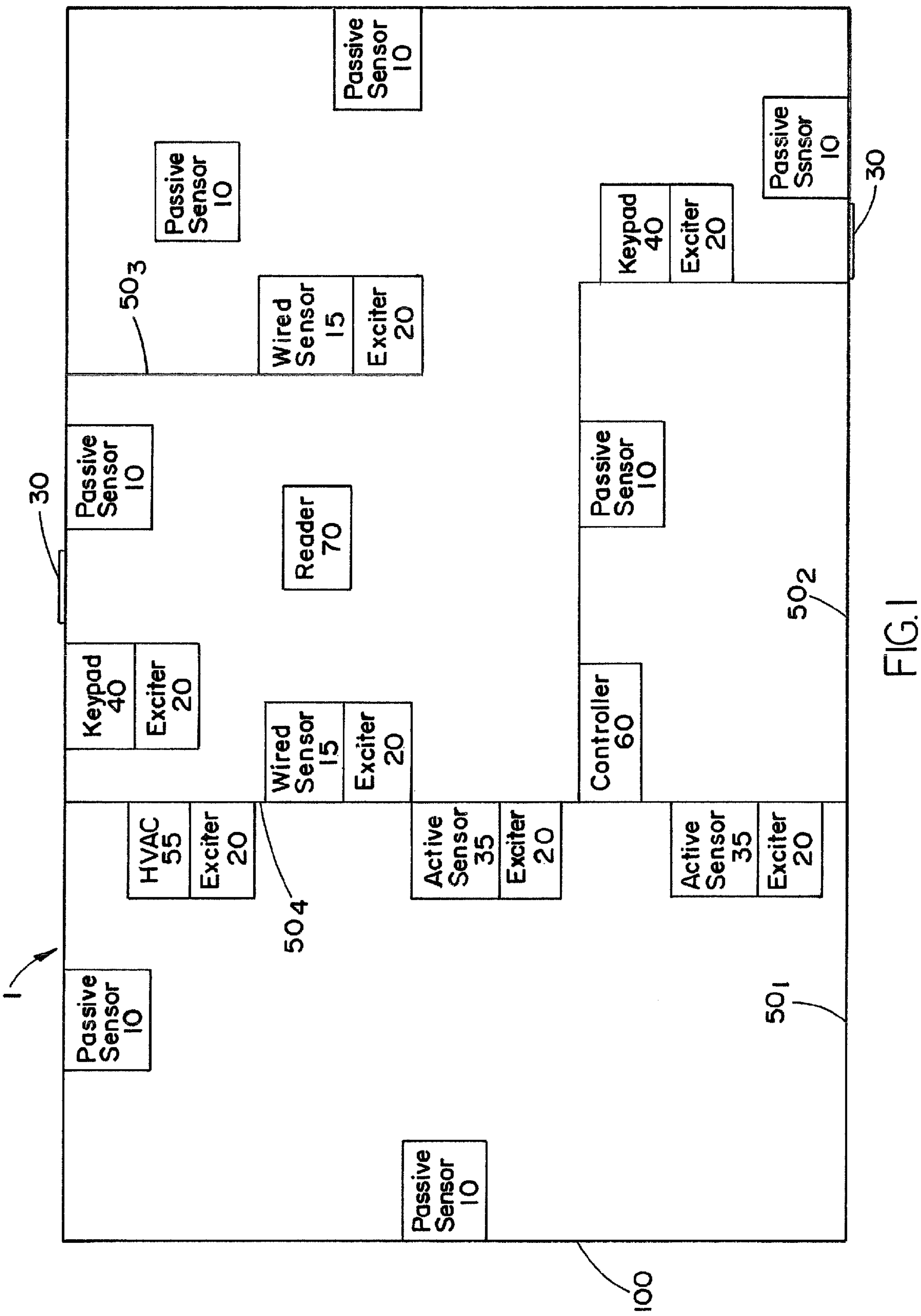
FIG. 1 illustrates a diagram of an exemplary passive wireless system according to the invention.

FIG. 1 illustrates a diagram of an exemplary passive wireless system 1. The passive wireless system 1 includes a controller 60 that communicates with a number of passive sensors 10, wired sensors 15 or active sensors 35 via a wired or wireless path. The sensors 10, 15 and 35 are deployed throughout a protected premises 100. The sensors 10, 15 and 35 are separated into specific zone, generally referenced as "50". Additionally, the sensors 10, 15 and 35 are divided into interior and perimeter sensors. Perimeter sensors monitor entranceways into the protected premises 100, such as window and doors 30. Interior sensors monitor zones within the protected premises 100. The sensors 10, 15 and 35 are activated either as perimeter sensors "on" or both perimeter and interior sensors "on", depending on a status of the passive wireless system 1.

There are many types of sensors 10, 15 and 35 that can be used with the invention, including, but not limited to asset, glass break, shock, impact, motion, temperature and dual technology sensors. More than one sensor 10, 15 and 35 can be deployed in a specific zone $\mathbf{50}_n$. The temperature sensors can interface with a security system or a temperature control system. Having a temperature sensor is each zone provides for an effective temperature control system.

The passive wireless system 1 further includes a keypad 40. As illustrated, the keypad 40 is separate from the controller 60; however, the two can be integrated.

The keypad 40 is commonly provided in a housing and affixed to a wall or placed on a table. The controller 60 may be installed, e.g., in a closet or basement. The keypad 40 is typically deployed near an entranceway to the protected premises 100, i.e., near doors 30. The keypad 40 can be a wired or wireless device. The keypad 40 serves as a user interface device for controlling the passive wireless system, e.g., monitoring system.

Signals received from the keypad 40 may arm and disarm the passive wireless system 1. The keypad 40 may adjust a temperature setting for a thermostat or a HVAC system controller. The keypad 40 allows a user to change the status of the passive wireless system 1 or allow an installer to configure the passive wireless system 1. The keypad 40 includes control section, memory, and power source.

The controller 60 is adapted to notify local emergency services and/or a remote monitoring station (not shown) of an alarm condition via a telephone dialer, internet connection, cellular telephone modem or any other long range communications network. Furthermore, a telephone network interface (not shown), such as a modem, allows the controller to send and receive information via a communication link. The controller 60 is configured to receive signals from the sensors 10, 15 and 35. The signals can be directly received from the sensors 10, 15 and 35. Additionally, the signal can be relayed by a reader 70 that communicates with the passive sensors 10. The reader 70 communicates with a passive sensor 10 using backscatter modulation. An amount of the power incident on the passive sensor 10 is reflected back to the reader 70. The reflected power is proportional to the signal received by passive sensor 10. The passive sensors 10 transmit at a UHF frequency range.

The passive wireless system 1 includes a plurality of exciters 20. The exciters 20 are transmitters that broadcast a radio frequency signal. The radio frequency signal is received by the passive sensors 10 and is used to supplement the power that is received from the reader 70. By using the plurality of exciters 20, any limitation of distance between the reader 70 and each passive sensor 10 is removed. Each exciter 20 broadcasts a signal in the UHF frequency range. The broadcast signal is a low power signal such that FCC licensing requirements or FCC regulation is avoided.

In an embodiment, the broadcast signal is transmitted as a signal burst, i.e., pulse signal. The duration of the signal burst is controlled by the controller 60. Additionally, the signal burst from each exciter 20 is transmitted at a variable transmission interval, e.g., every 2 seconds. The transmission interval is generally referenced as "400". Each exciter 20 can have a different variable transmission interval 40 such that there is no signal interference. The controller 60 assigns a time slot to each exciter 20 such that the transmissions are time-divided.

The exciters 20 are integrated into existing monitoring system components, such as a wired sensor 15, an active sensor 35 a keypad 40 or HVAC controller 55. The keypad 40 can be a security system keypad (user interface) or a temperature control user interface for controlling or adjusting a heater or air conditioner. The use of existing components eliminates a need to design a dedicated exciter or install exciters separately, which would increase the installation cost. Use of existing components also ensures that the power supplied to the exciters 20 is monitored and has a battery back-up in case of power loss to a building.

Figure 2:
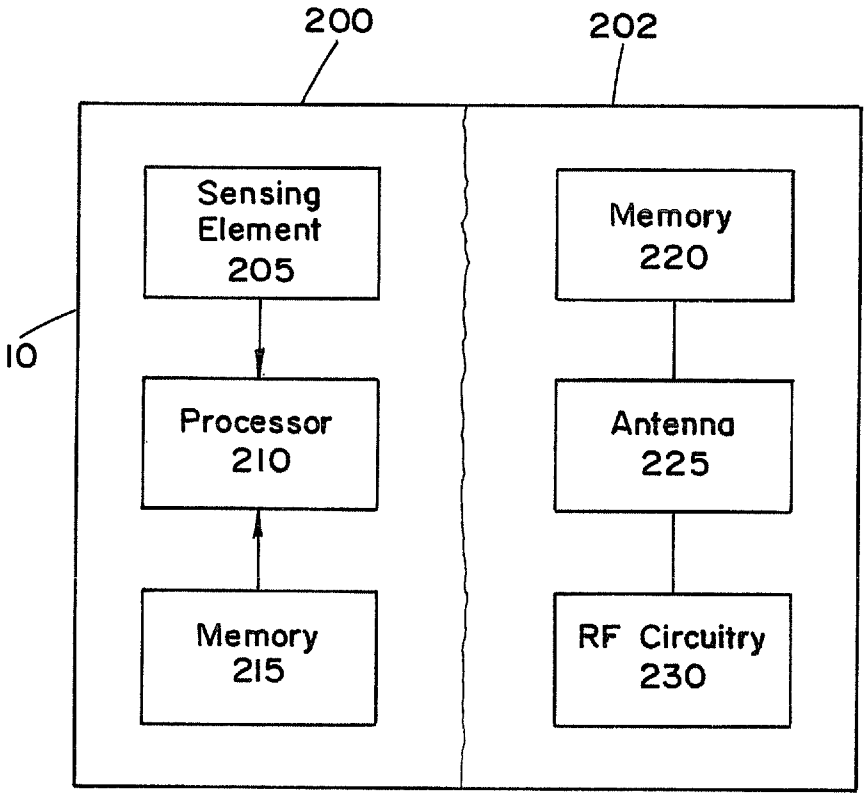
FIG. 2 illustrates a diagram of an exemplary passive sensor according to the invention.

FIG. 2 illustrates a block diagram of an exemplary passive sensor 10. The passive sensor 10 includes two functional blocks: a sensing section 200 and a RE section 202. The sensing section 200 senses and determines if an event is detected. The RF section 202 responds to external queries to the passive sensor 10 and reports any detected event.

The sensing section 200 includes a sensing element 205, a processor 210 and memory 215. The sensing element 205 can be, but is not limited to a simple magnetic contact, a PIR, a MEMS element or heat detector. The processor 210 can be any device capable of being programmed or executing a program such as a microprocessor, an ASIC, and a logic device such as a PLD or FPGA. The processor 210 determines if the sensing element 205 outputs a signal indicative of an event. For certain events, the processor 210 compares the output from the sensing element with prestored signal patterns or thresholds to determine if an event is detected. The prestored signal patterns or thresholds are stored in memory 215.

In an embodiment, the RF section 202 includes a passive RFID tag which backscatters UHF frequency signals received from a reader 70 or the exciters 20. For example, a EPC type 1, Gen 2 RFID tag can be used. The RF section 202 contains memory 220, an antenna 225 and RF circuitry 230. The memory 220 includes an user accessible memory section, a fixed memory section, and a secure memory section. The fixed memory section is used to store the identification of the passive sensor 10. The secure memory section stores authentication information and encryption key information for secure transmission.

In an embodiment, the reader 70 includes both a UHF field generation section and a receiver for receiving the backscatter signals from the passive sensors 10.

The controller 60 assigns a transmission time slot and a transmission interval 400 for each exciter 20 to avoid interference between signals from nearby exciters. Additionally, by varying the transmission interval 400 and controlling each exciter 20 separately, the controller 60 can quickly identify the location of the passive sensor 10 which transmitted a signal.

The controller 60 can change or vary the transmission interval 400 for each exciter 20 based upon several different factors. These factors can include, but is not limited to, the status of the passive wireless system 1, such as armed-stay, armed-away or disarmed, the state of the system, such as an alarm state, a time schedule, a priority between passive sensors 10, the state of other sensors in the same zone as the passive sensor 10, transmission state of other exciters 20, type of passive sensor 10, a relative location of the exciters 20 to the passive sensors 10 and the state of a HVAC sensor or HVAC system controller.

Since the exciters 20 are integrated into existing monitoring system components, e.g., wired sensor 15, active sensor 35 and keypad 40, the location of the exciters 20 are apriori known. Alternatively, during installation, the installer can program the controller 60 with the location of the monitoring system components, e.g., zone 50.

The controller 60 can assign a time slot for the transmission of each exciter 20 to be offset by a preset offset value, e.g., 0.1 secs. The offset prevents interference between nearby exciters 20 since the exciters 20 are transmitting on the same frequency band.

Additionally, if the passive wireless system 1 is a security system that is armed, in an armed stay mode, the controller 60 can vary the transmission interval 400 for the exciters 20 that are deployed near or on the perimeter of the protected area 100 to have a shorter transmission interval 400, e.g., from an interval of 2 seconds to an interval of 1 second. Furthermore, the controller 60 can vary the transmission interval 400 for the exciters 20 that are deployed in the interior of the protected area have a longer transmission interval 400, e.g., from an interval of 1 second to 5 seconds.

Furthermore, if the controller 60 receives a signal from another sensor 10, 15 or 35 indicating that an event has been detected, the controller 60 can vary the transmission interval 400 for the exciters 20 that are deployed near the sensor 10, 15 or 35 that detected the event is a shorter transmission interval 400. Additionally, the controller 60 can vary the transmission intervals 400 for all exciters to have a shorter transmission interval.

If more than one passive sensor 10 is deployed in a protected area, a priority between each passive sensor 10 can be used to vary the transmission interval 400 for the exciters 20. An exciter 20 that is located near a high priority sensor has a transmission interval 400 that is shorter than an exciter located near a low priority passive sensor 20. For example, a high priority sensor can be a heat detector.

Additionally, if more than one factor is used to determine the transmission interval 400, the controller 60 can be programmed with a factor priority. A priority is selected to resolve any conflict between the factors. For example, if the factor is both a time of day and the status of the passive wireless system 1, a conflict can arise if one factor dictates that a shorter transmission interval should be used and the other factor dictates that a longer transmission interval should be used.

The installer can customize the priority. In another embodiment, a default priority can be used.

Additionally, the amount in which a transmission interval 400 is varied based upon each factor can be preset during manufacture of the controller 60. Alternatively the amount in which the transmission interval 400 is varied can be set during installation.

Figure 3:
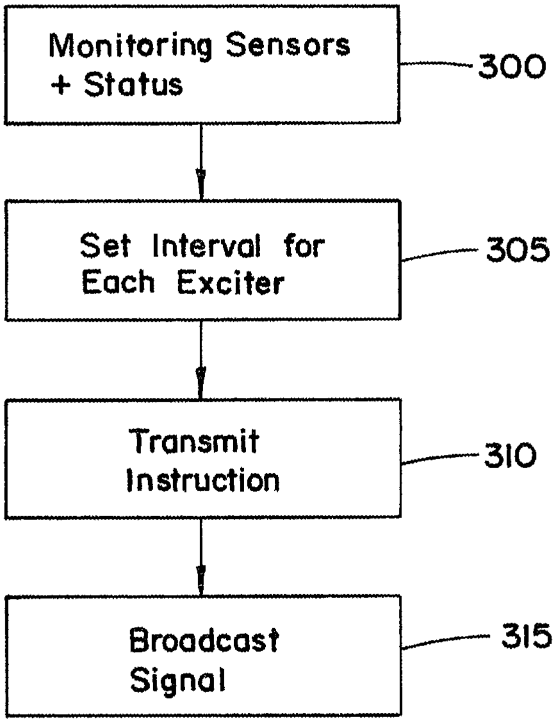
FIG. 3 illustrates a flow chart of a method of controlling a transmission interval for an exciter according to the invention.
Figure 4:
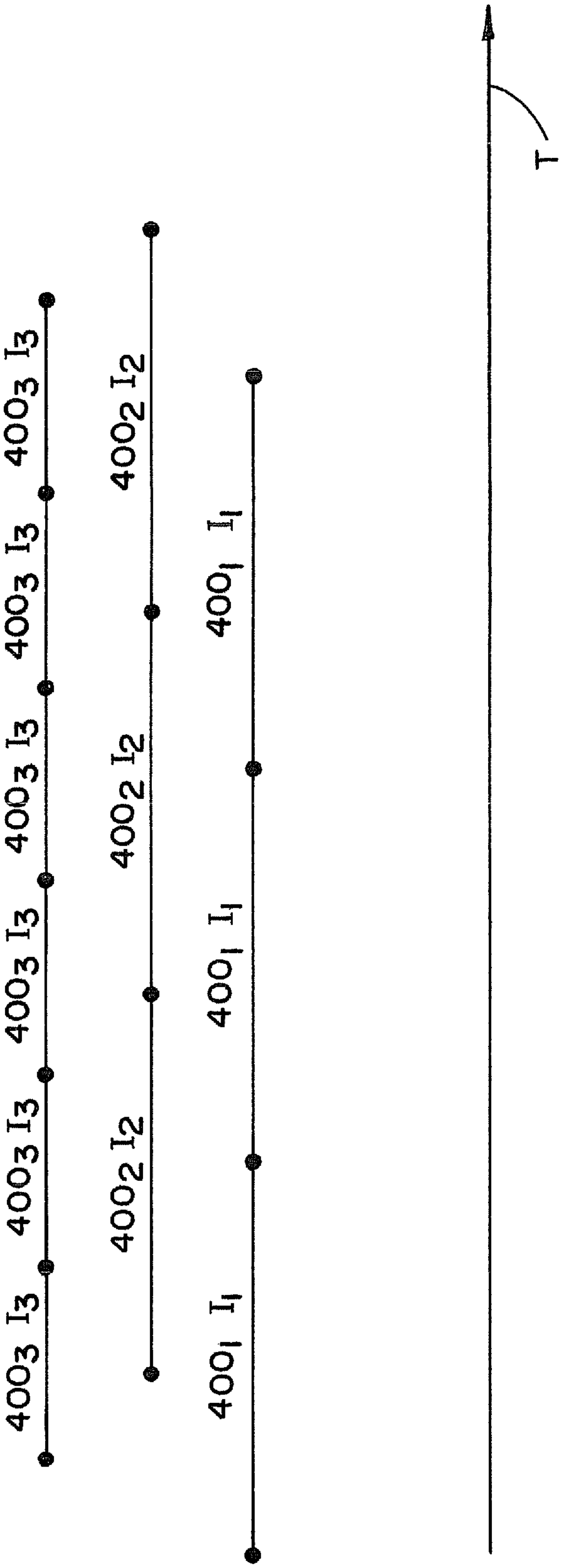
FIG. 4 illustrates an example of three transmission intervals.

FIG. 3 illustrates a method for setting a transmission interval 400 according to the invention. At step 300, the controller 60 continuously monitors the output from each sensor 10, 15, and 35 and the status of the passive wireless system 1, as controlled by a keypad 40. At step 305, the controller 60 assigns a time slot, and sets a transmission interval 400 for each exciter 20. The transmission interval 400 can be assigned to each exciter 20 using the output from each sensor 10, 15 and 35, the status received from the keypad 40 and the location of each exciter 20 as decision parameters. For example, FIG. 4 illustrates an exemplary transmission interval ($400_1$, $400_2$ and $400_3$) for three exciters ($I_1$, $I_2$ and $I_3$). As depicted, the three transmission intervals ($400_1$, $400_2$ and $400_3$) are set such that no exciter 20 broadcasts a signal at the same time, i.e., offset. Additionally, as depicted the three transmission intervals are not the same. $I_3$, $400_3$ is shorter than $I_1$ $400_1$ and $I_2$. $400_2$. For example, the transmission interval $I_3$ $400_3$ can be used for an exciter 20 located near a passive heat detector and transmission intervals $I_1$ $400_1$ and $I_2$, $400_2$ can be uses for two exciters 20 located near a passive interior sensor 10. Once the transmission interval 400 is set (at step 305), the controller 60 transmits a control signal to each exciter 20. The control signal includes information regarding the time slot, and transmission interval. Additionally, the control signal will contain information for controlling other functionality of the security system component in which the exciter 20 is integrated.

At step 310, each exciter 20 broadcasts its signal burst, e.g., pulse signal during its assigned time slot and repeats the signal burst every transmission interval 400.

Alternatively, in another embodiment of the invention, each exciter 20 continuously broadcasts a signal to the passive sensors X10.

In another embodiment, the exciter 20 can be integrated into a home automation network. Various types of home automation networks are currently available for controlling different functions in the home, such as heating and cooling, lights, home entertainment, kitchen appliances, and computers. For example, the X10 standard uses the existing power lines in a home as a network media to carry data. According to this embodiment an exciter 20 (transceiver) plugs or wires into one location in the home to send the power pulse signal to the passive sensors 10 in another location in the home. A controller 60 communicates with the exciter 20. For example, a wall switch may send a wireless signal to a transceiver to turn a light on or off, or set a dimming level. A receiver is typically connected to the light by a wired path for controlling the amount of electricity that is provided to the light. The transceiver and receiver include respective controls for achieving the desired functionality.

The present invention can take advantage of such networks as follows. For example, the controller 60 can be configured to transmit, to the exciter 20, a signal with a command for broadcasting the pulse signal. The exciter 20 transmits a corresponding signal to the sensor 10 or control 60 via the existing power lines or a wireless connection. Various other approaches using home automation networks are possible.

RF signals advantageously do not require the exciter 20 to be aimed at the passive sensor 10 and do not require a clear line of sight.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A passive wireless system for monitoring a protected area comprising:

a plurality of passive sensors deployed throughout the protected area, each of the plurality of passive sensors operable to detect a respective security event at a location of the passive sensor within the protected area;

a reader that receives signals from the plurality of passive sensors;

a plurality of exciters disposed at respective known locations throughout the protected area, each of the plurality of exciters transmitting a radio frequency pulse at a variable time interval that powers at least one passive sensor of the plurality of passive sensors; and a controller that separately controls each of the plurality of exciters to transmit the radio frequency pulse at the variable time interval and that detects responses through the reader from sensors located near and that are powered by the radio frequency pulse of the transmitting exciter, wherein each of the plurality of exciters has a different variable transmission interval such that there is no signal interference among the plurality of exciters and wherein by varying the time interval and controlling each of the exciters separately, the controller identifies the location of the at least one passive sensor which transmitted a signal in response to the transmitted radio frequency pulse based upon the known location of the transmitting exciter wherein the controller selects the variable time interval of at least some of the plurality of passive sensors depending on a status of said passive wireless security system, said status being disarmed, armed-stay and armed-away.

2. The passive wireless system of claim 1, wherein each of the plurality of exciters is integrated into a security system device.

3. The passive wireless system of claim 2, wherein the security system device is a security system keypad.

4. The passive wireless system of claim 2, wherein the security system device is a wired security system sensor.

5. The passive wireless system of claim 1, wherein the variable time interval is distinct for each of said plurality of exciters.

6. The passive wireless system of claim 1, wherein the controller selects the variable time interval depending on a location of each of the plurality of exciters within the protected area.

7. The passive wireless system of claim 1, wherein the controller selects the variable time interval depending on a relative location of each of the plurality of exciters to each of the at least one passive sensor.

8. The passive wireless system of claim 1, wherein the controller selects the variable time interval depending on a type of each of the at least one passive sensor, said type being a magnetic contact motion sensor, heat detector, acoustic detector and asset sensor.

9. The passive wireless system of claim 1, wherein the controller selects the variable time interval depending on a location of each of the at least one passive sensor within the protected area.

10. The passive wireless system of claim 1, wherein the controller selected the variable time interval depending on a priority of each of the at least one sensors.

11. The passive wireless system of claim 1, wherein the controller sets the variable time interval for each exciter to be offset from each other.

12. A wireless communication method between a plurality of passive sensors and a wireless reader within a protected area comprising the steps of:

deploying the plurality of passive sensors throughout the protected area;

integrating a plurality of wireless exciters into the protected area at different respective known locations;

assigning a respective transmission time for each of a plurality of wireless exciters wherein each of the plurality of wireless exciters has a different variable transmission interval such that there is no signal interference among the plurality of exciters;

transmitting control signal including the assigned transmission time to each of the plurality of wireless exciters; and transmitting, during the assigned time, a pulse power signal from each of the plurality of exciters to the passive sensors, wherein at least some of the passive sensors located near the transmitting exciter are excited by and powered by the pulse power signal from the transmitting exciter;

detecting a signal from one of the plurality of sensors in response to the power pulse signal from the transmitting exciter through the reader; and identifying the location of the passive sensor which transmitted the detected signal in response to the power pulse based upon the assigned time of the power pulse signal and known location of the transmitting exciter wherein the controller selects the variable time interval of at least some of the plurality of passive sensors depending on a status of said passive wireless security system, said status being disarmed, armed-stay and armed-away.

* * * * *